Sept. 15, 1959 W. A. FIEDLER 2,903,851
JET DEFLECTOR
Filed May 7, 1956 2 Sheets-Sheet 1

INVENTOR.
WILLY A. FIEDLER
BY
George J. Rubens
ATTORNEYS

Sept. 15, 1959 W. A. FIEDLER 2,903,851
JET DEFLECTOR
Filed May 7, 1956 2 Sheets-Sheet 2

*INVENTOR.*
WILLY A. FIEDLER

BY

*ATTORNEYS*

United States Patent Office 2,903,851
Patented Sept. 15, 1959

2,903,851

JET DEFLECTOR

Willy A. Fiedler, Woodland Hills, Calif., assignor to the United States of America as represented by the Secretary of the Navy Application May 7, 1956, Serial No. 583,336

4 Claims. (Cl. 60—35.54)

(Granted under Title 35, U.S. Code (1952), sec. 266)

The invention described herein may be manufactured and used by or for the Government of the United States of America for governmental purposes without the payment of any royalties thereon or therefor.

This invention relates to thrust direction correcting devices, and more particularly to a trim tab deflector capable of being mounted against the inside wall of a supersonic jet nozzle of an aircraft to achieve maximum thrust deflection for a given deflector size, and to a method for determining the ultimate size and angular position of such a deflector around the nozzle periphery.

The need for thrust direction correcting devices in jet aircraft arises principally to correct misalignment of the thrust axis with a reference line extending through the center of gravity of the aircraft, a condition which can be caused by factors effecting the center of gravity of the aircraft or the nozzle centerline. In some instances, deflection correction has been accomplished by a movably mounted jet motor or nozzle, or by one or more vanes or interceptors which are immersed in the jet flow to produce the desired deflection. While these arrangements may be desirable in some instances where variable deflection is necessary during flight, for application requiring a fixed deflection they are excessively complex and costly, particularly when considered for guided missile application.

A fixed jet deflector has been integrally mounted as an offset extension to the aft end of the nozzle of the jet aircraft to compensate for destabilizing moments, as illustrated in U.S. Patent 2,654,552, issued October 6, 1953. While this type of deflector may be suitable for subsonic nozzle flow, it is not desirable for supersonic flow. Such a deflector is inflexible in use being fabricated as an integral part of the tail pipe or surrounding structure, and is therefore capable of correcting only a misalignment condition predetermined before fabrication. Another disadvantage resides in the varying characteristic of the deflection obtained throughout the thrust period. Another type of deflectors called interceptors are immersed into the jet stream in a direction normal thereto, and, while these deflectors are generally satisfactory for very small deflections, they are not otherwise feasible because they inherently produce a detached or separate shock wave within the nozzle causing excess drag which reduces efficiency.

In the present invention, it has been discovered that deflection of supersonic flow can be obtained more efficiently by creating an attached shock wave within the nozzle. This can be accomplished by mounting a trim tab deflector on the nozzle and having a substantial portion of the deflecting surface extending into and intersecting the inside nozzle wall in contiguous relation. The leading edge of the deflecting surface conforms to the configuration of the interior nozzle wall in such a way as to prevent the creation of a detached shock wave at any point of intersection. The ultimate length, area, and angle with the nozzle wall of the deflecting surface will depend on the amount of deflection required, nozzle dimensions, and other factors to be described hereinafter. On or more deflectors are capable of being secured to the nozzle at predetermined stations around the nozzle periphery to create a thrust component needed to correct the misalignment conditions. In the illustrated embodiment, the securing means comprises a slot formed in the deflector body and a traversely disposed threaded member, and the various stations on the nozzle rim are designated by recesses adapted to seat the end of the threaded member in locking engagement.

A principal object of this invention is to provide a trim tab deflector capable of being positioned on a supersonic jet nozzle to produce a maximum deflection for a given size and weight.

Another object is to provide a deflector which can be positioned inside the jet nozzle to create an attached shock wave therein.

Still another object is to provide a deflector that will produce a constant angle of thrust deviation independent of the chamber pressure, which may vary with the propellant burning area in the case of rockets or with the environmental temperature.

A further object is to provide a method for locating the required position of a deflector to correct a misalignment condition.

Still other objects are to provide a deflector which can be readily attached in position, and be of a light weight and simple construction.

Other objects and many of the attendant advantages of this invention will be readily appreciated as the same becomes better understood by reference to the following detailed description when considered in connection with the accompanying drawings wherein.

Figure 1:
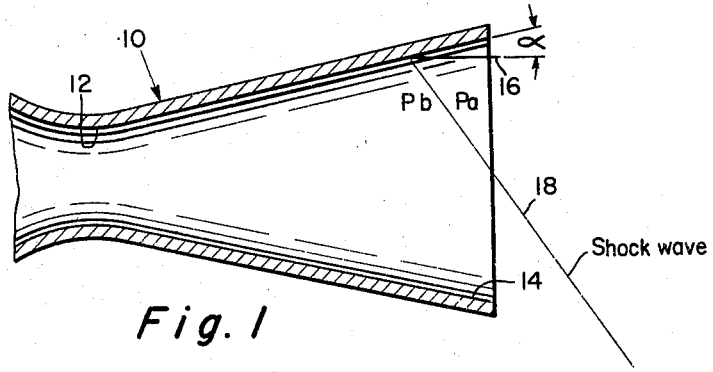
Fig. 1 is a longitudinal section of a conventional supersonic flow nozzle extending from the throat section to the exit section, and in which is mounted a deflecting surface to utilize the pressures created thereon by an attached shock wave.
Figure 2:
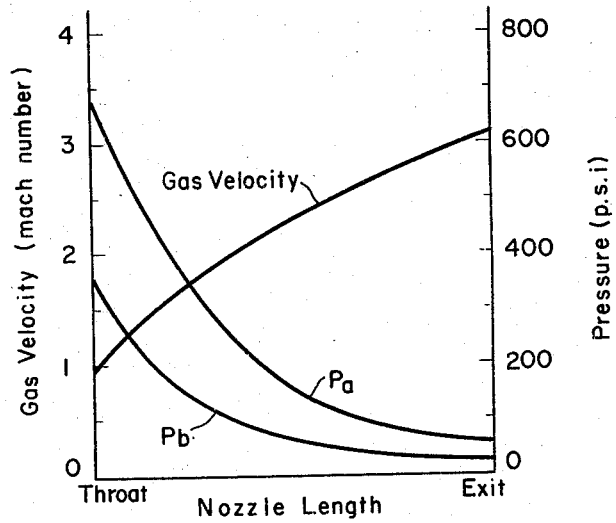
Fig. 2 shows a plot of the relationship of gas velocity and gas pressures existing along the length of the nozzle between the throat and exit sections in front of and behind the attached shock wave.

Referring now to the drawings wherein like reference characters designate like or corresponding parts throughout the several views, there is shown in Fig. 1, a conventional supersonic nozzle 10 of a conical configuration having a constricted throat section 12 and an exit section 14. If a deflecting surface 16 of a body is mounted at a given angle α to the inner nozzle wall at various positions along the nozzle length an attached shock wave 18 is formed. The pressures and gas velocities in the nozzle as shown in Fig. 2 have been obtained from a 1000 pound thrust, 15 seconds burning time, solid propellant rocket motor. It will be noted that the gas velocities (Mach Nos.) increase from the throat section to the exit section, while the pressure before the shock wave ($P_b$) and the pressure after shock wave ($P_a$) will each decrease in asymptotic relation from the nozzle throat to the exit.

Accordingly, it is an important feature of this invention to utilize the higher pressures existing within the supersonic nozzle to obtain the transverse component of thrust needed for the desired deflection. This requires a deflector having a deflecting surface which can be positioned inside the supersonic nozzle at the desired location. To avoid performance losses, the deflecting surface must not be inserted beyond the point where the shock wave will interact with the opposite side of the nozzle.

Figs. 4-7, inclusive, illustrate a preferred embodiment of a deflector 22 incorporating deflecting surface 16. The deflector is constructed as a tab comprising a body having a wedge or tapered leg portion 20 and provided with a longitudinal slot 24 in the forward end thereof formed between another leg portion 25 of the body for attachment to the nozzle rim. The deflector is made of a suitable heat resistant material. If necessary, the nozzle rim can be strengthened by an outwardly extending annular lip or shoulder 26, and in such construction slot 24 conforms to the cross-sectional area thereof. The deflector body is clamped to the nozzle rim by a threaded bolt 28 extending transversely into slot 24 through leg portion 25 and terminating in an end portion adapted to be seated in a corresponding recess 30 formed in the outer periphery of shoulder 26 and functioning as a detent to lock the tab thereto.

Figure 4:
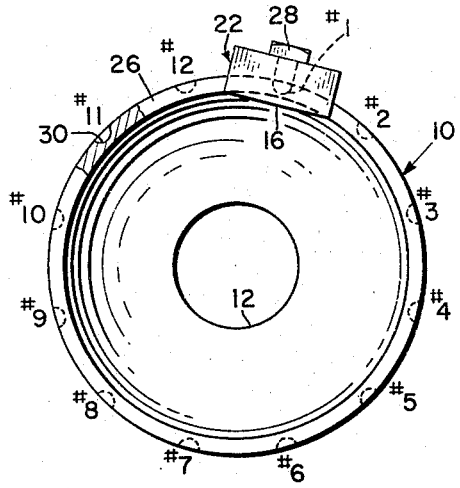
Fig. 4 is an aft end view of a jet nozzle with a deflector of this invention mounted at a selected station around the nozzle periphery.
Figure 7:
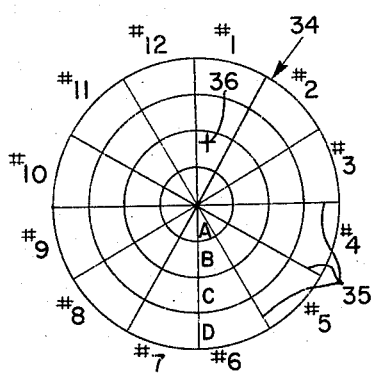
Fig. 7 is a reticle of an alignment telescope employed in a method of determining the required location of the deflector or deflectors on the nozzle to trim the aircraft.

To enable the deflector to be mounted anywhere along the periphery of the nozzle to furnish the thrust component necessary to correct the misalignment conditions, a plurality of depressions or recesses 30 are provided in shoulder 26 in spaced relationship completely around the nozzle, each recess designating a deflector station. Twelve such stations, numbered 1 to 12, inclusive in a clockwise direction looking forward, are illustrated in Fig. 4, however, the number of stations may vary depending on the accuracy required. The method for determining the proper location on the deflector tabs will be hereinafter described.

Figure 5:
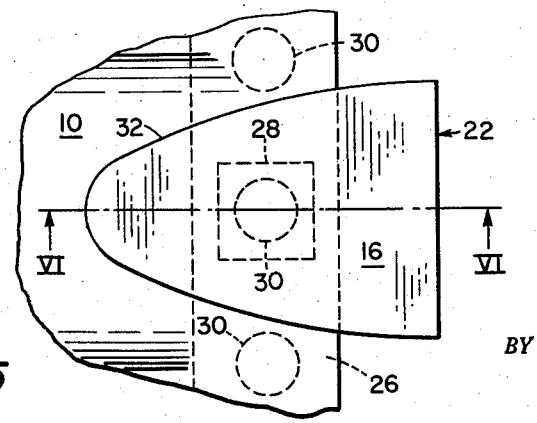
Fig. 5 is a plan view of the deflector taken from within the nozzle.

Deflecting surface 16 is incorporated on the tapered body portion 20 and may be a curved or a plane surface disposed to intersect the inside nozzle wall at a predetermined angle α. In the preferred embodiment, deflecting surface 16 is a plane surface, and a value of α has been chosen so that the deflecting surface is parallel to the longitudinal axis of the nozzle, being a relation that will produce minimum drag. The deflector body portion having surface 16 terminates in a sharp leading edge 32 adapted to conform to the contour of the nozzle wall and in contiguous relation therewith to create an attached shock wave when mounted within the nozzle. In a conical shaped nozzle the leading edge will be a hyperbolic curve as shown in Fig. 5. It is obvious that the total transverse thrust component will also depend on the total area of deflecting surface 16 and its longitudinal position within the nozzle. A set of different sized deflector tabs can be provided to satisfy a desirable range of deflection for a particular nozzle.

Figure 3:
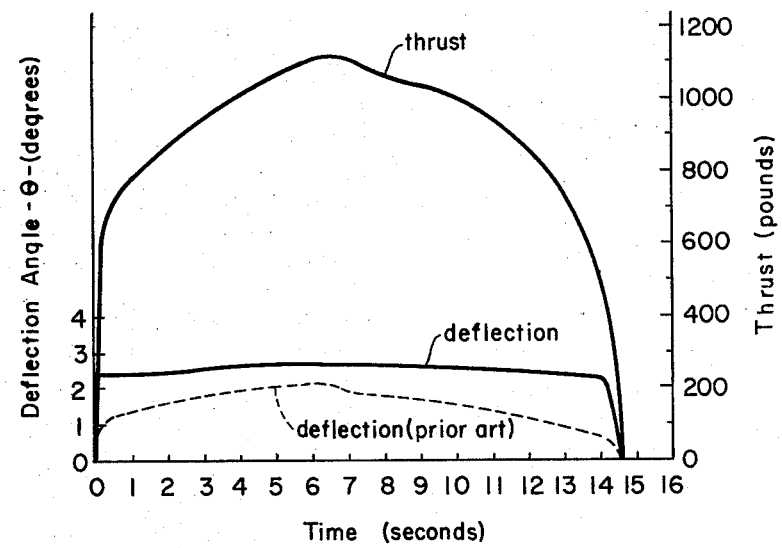
Fig. 3 shows a plot of the deflection angles obtained throughout the burning period of a motor having a varying thrust output.
Figure 6:
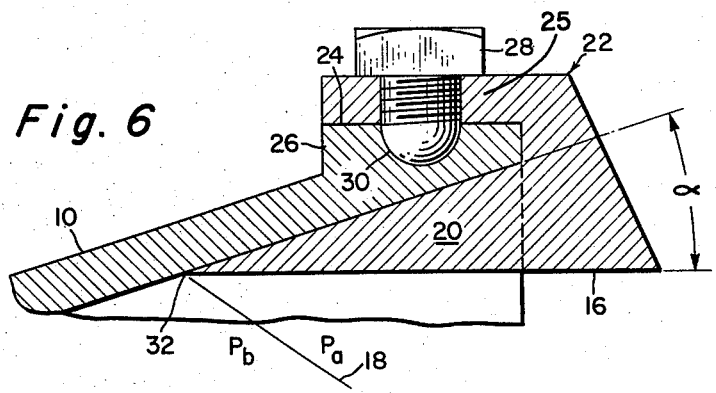
Fig. 6 is an enlarged cross-sectional view of the deflector taken along line V1—V1 of Fig. 5.

To take advantage of the invention, it is preferred that the maximum portion of the deflector length be disposed inside the nozzle, however, as a practical matter a sufficient portion of the deflector body must necessarily extend beyond the trailing edge of the nozzle to furnish an adequate support therefor. The solid line curve in Fig. 3 illustrates the deflection (in degrees) that can be obtained from the rocket motor previously described using a tab deflector according to the preferred embodiment. It can be noted that throughout the burning time of the rocket motor, the angle of deflection remainder constant while the axial thrust varied greatly. This is a desirable feature for the thrust alignment should remain unchanged during the boost phase of most guided missiles. The curve represented by the broken line indicates the deflection that is obtainable when the deflecting surface is entirely outside the nozzle exit of the type similar to that shown in U.S. Patent No. 2,654,552 previously described. It is noted that in this instance the deflection varies greatly as compared to the invention deflector.

The following alignment procedure is employed to determine the size of the deflector to be employed and its optimum circumferential location around the nozzle rim to rectify a condition causing a misalignment of the thrust. As an example, assume that the misalignment condition is caused by an unusual location of the missile center of gravity. An alignment telescope is mounted on the nozzle parallel to the nozzle centerline, the telescope being provided with a special reticle 34 shown in Fig. 7. Reticle 34 has twelve cross hairs 35 dividing the reticle into twelve equal sectors, corresponding to the twelve numbered stations on nozzle shoulder 26 shown in Fig. 4 and similarly numbered. The field is also divided into four concentric zones A, B, C and D, the three outer zones requiring three different size deflectors from the smallest to the largest, respectively. The innermost zone does not require any thrust correction. A suitable distant target is represented by a reference numeral 36 representing the aiming point of the telescope, which target would normally appear at the center of reticle 34 if the center of gravity of the missile is on the nozzle centerline. However, in Fig. 7 target 36 appears in sector No. 1 and in zone B, which indicates that a size B deflector is needed at position number 1 on the nozzle rim (Fig. 4). In this position, the force created on the deflecting surface is sufficient to compensate for the misalignment condition. The resultant of all forces will now pass through the aiming point.

The deflector of this invention achieves maximum efficiency in the thrust deflection of aircraft employing supersonic nozzles by reducing the size and weight of the deflector. And in aircraft, particularly guided missiles, the reduction of weight is important. In addition, the deflector provides the required deviation angle independent of the thrust. The alignment procedure provided enables a wide range of misalignment conditions to be quickly and accurately determined and corrected by unskilled check-out crews. The invention device eliminates the need for expensive, close tolerance fabrication operations, and replaces elaborate and expensive adjustable nozzles.

Obviously many modifications and variations of the present invention are possible in the light of the above teachings. It is therefore to be understood that within the scope of the appended claims the invention may be practiced otherwise than as specifically described.

I claim:

1. A thrust deflector for a supersonic flow nozzle having a rim comprising a body securable to the nozzle rim, said body having two leg portions extending therefrom and spaced apart to receive the nozzle rim, one leg portion formed as a wedge positionable substantially within the nozzle and having an inner smooth deflecting surface, an inner portion of the wedge terminating in a sharp leading edge abutting and conforming with the contour of the inner nozzle wall for producing an attached shock wave within the nozzle at the intersection of said deflecting surface and the inner nozzle wall, the other leg portion of the body positioned externally and adjacent the nozzle, and detachable securing means mounted on said other leg portion externally the nozzle for clamping the body to the nozzle rim and the wedge snugly within the nozzle and against the inner nozzle wall.

2. A thrust deflector for a supersonic flow nozzle having a rim comprising a body securable to the nozzle rim, said body having two leg portions extending therefrom and spaced apart to receive the nozzle rim, one leg portion formed as a wedge positionable substantially within the nozzle and having an inner smooth deflecting surface, an inner portion of the wedge terminating in a sharp leading edge abutting and conforming with the contour of the inner nozzle wall for producing an attached shock wave within the nozzle at the intersection of said deflecting surface and the inner nozzle wall, the other leg portion of the body positioned externally and adjacent the nozzle, and detachable securing means mounted on said other leg portion externally the nozzle, said means including a threaded member extending through said other leg and engageable with the rim for clamping the body to the nozzle rim and the wedge snugly within the nozzle and against the inner nozzle wall.

3. A supersonic flow nozzle having a rim portion, a plurality of depressions formed in and spaced around the outer periphery of said rim to designate a plurality of preselected stations, a thrust deflector comprising a body securable to the rim portion at a selected station, said body having two leg portions extending therefrom and spaced apart to receive the nozzle rim, one leg portion formed as a wedge positionable substantially within the nozzle and having an inner smooth deflecting surface, an inner portion of the wedge terminating in a sharp leading edge abutting and conforming with the contour of the inner nozzle wall for producing an attached shock-wave within the nozzle at the intersection of said deflecting surface and the inner nozzle wall, the other leg portion of the body positioned externally and adjacent the nozzle, and detachable threaded means mounted on and extending transversely through said other leg portion externally the nozzle to engage the corresponding depression at a selected station and for clamping the body to the nozzle rim and the wedge snugly within the nozzle and against the inner nozzle wall.

4. A thrust deflector for a supersonic flow nozzle having a rim comprising a body securable to the nozzle rim, said body having two leg portions extending therefrom and spaced apart to receive the nozzle rim, one leg portion formed as a wedge positionable substantially within the nozzle and having an inner smooth deflecting surface, an inner portion of the wedge terminating in a sharp leading edge abutting and conforming with the contour of the inner nozzle wall for producing an attached shock wave within the nozzle at the intersection of said deflecting surface and the inner nozzle wall, said deflecting surface extending substantially parallel to the longitudinal axis of the nozzle, the other leg portion of the body positioned externally and adjacent the nozzle, and detachable securing means mounted on said other leg portion externally the nozzle for clamping the body to the nozzle rim and the wedge snugly within the nozzle and against the inner nozzle wall.

References Cited in the file of this patent
UNITED STATES PATENTS

| | | |
|---|---|---|
| 2,136,633 | Morse | Nov. 15, 1938 |
| 2,378,545 | Fraser et al. | June 19, 1945 |
| 2,654,552 | Jonas | Oct. 6, 1953 |
| 2,681,547 | MacDonald | June 22, 1954 |
| 2,694,898 | Stauff | Nov. 23, 1954 |
| 2,702,986 | Kadosch et al. | Mar. 1, 1955 |